(12) United States Patent
Bender (10) Patent No.: US 9,597,805 B2
(45) Date of Patent: Mar. 21, 2017

(54) CARE APPARATUS

(71) Applicant: Nathaniel Bender, San Rafael, CA (US)

(72) Inventor: Nathaniel Bender, San Rafael, CA (US)

(*) Notice: Subject to any disclaimer, the term of this patent is extended or adjusted under 35 U.S.C. 154(b) by 10 days.

(21) Appl. No.: 14/673,769

(22) Filed: Mar. 30, 2015

(65) Prior Publication Data

US 2015/0273698 A1   Oct. 1, 2015

Related U.S. Application Data

(60) Provisional application No. 61/972,168, filed on Mar. 28, 2014.

(51) Int. Cl.
*G01C 22/00* (2006.01)
*G05D 1/00* (2006.01)
*B25J 11/00* (2006.01)

(52) U.S. Cl.
CPC ............ *B25J 11/009* (2013.01); *Y10S 901/01* (2013.01)

(58) Field of Classification Search
CPC ..... B25J 11/009; G05D 1/0272; G05D 1/027; G05D 1/0278; G05D 2201/0216; G05D 1/0255
USPC .......................................................... 701/23
See application file for complete search history.

(56) References Cited

U.S. PATENT DOCUMENTS 8,376,803 B2    2/2013  Oonaka
2005/0215171 A1*  9/2005  Oonaka ................ A63H 3/28
                                                                446/301

FOREIGN PATENT DOCUMENTS

KR   WO 2009145388 A1 * 12/2009  ............. B25J 9/104
WO      2012141130 A1     10/2012

* cited by examiner

*Primary Examiner* — Maceeh Anwari
(74) *Attorney, Agent, or Firm* — Kilpatrick Townsend & Stockton LLP (57) ABSTRACT

A care apparatus is described that has the capability to sense environmental characteristics, detect a dependent's condition, and carry out suitable actions to care for the dependent. The care apparatus may move in various directions, store items, take images, play sounds, music, and videos, and facilitate two-way wireless communication with other devices.

20 Claims, 7 Drawing Sheets

CARE APPARATUS

CROSS-REFERENCES TO RELATED APPLICATIONS

This application is a non-provisional of and claims the benefit of priority to U.S. Provisional Application No. 61/972,168, filed Mar. 28, 2014, which is hereby incorporated by reference in its entirety for all purposes.

BACKGROUND

Parents are busy, and there is a need to help parents care for their children. Stationary baby monitors exist to help alert a parent when an infant needs care. However, these stationary baby monitors are merely notification devices that notify a parent that the infant is in need. When the parent is notified that the infant needs assistance (e.g., by hearing a baby cry), the parent must go to the infant to attend to it. While the notification devices are useful, they do not assist a parent in caring for a child, nor do they assist the parent in determining what the child may need or want.

Parents often struggle to understand what an infant, toddler or young child needs, especially before the child can speak. All children are unique and present different noises and cries for different reasons. Parents of young infants, particularly, are challenged with consistent monitoring and care for their children and often are confused as to how to help provide their child with comfort or address its needs.

Embodiments of the invention address these and other problems, individually and collectively.

BRIEF SUMMARY

Embodiments of the invention are directed to care apparatuses. In a preferred embodiment, a care apparatus may be an infant care apparatus.

The care apparatus includes a housing, a plurality of motion elements coupled to the housing, a motor coupled to the motion elements, at least one articulating element attached to the housing, and a storage area attached to the housing that can be used for storing care supplies. The care apparatus also includes a processor, a memory coupled to the processor, a power source coupled to the processor, a monitor coupled to the processor, a speaker coupled to the processor, and a microphone coupled to the processor. A communication device to configured for two way communication may also be coupled to the processor.

Other embodiments of the invention are directed to systems using the care apparatus. Such systems may include a mobile phone as well as a host server computer, Wi-Fi™, Bluetooth™ or other communication system, smart home device or network.

According to one embodiment of the invention, a care apparatus can receive an action request message comprising a requested action from a communication module associated with a dependent. The care apparatus can detect a plurality of devices associated with a plurality of caregivers and can select a first caregiver from the plurality of caregivers. Further, the care apparatus can send the action request message to a first device associated with the first caregiver and can determine whether to take further action based on whether a response is received from the first device associated with the first caregiver. Additionally, the care apparatus can detect that the requested action has been completed by communicating with at least the communication module associated with the dependent. In some implementations, the computer can also send a notification that the requested action has been completed to at least the first device associated with the first caregiver.

In some embodiments, the computer can take further action by sending the action request message to a second device associated with a second caregiver. In other embodiments, the computer can take further action by soothing the dependent after receiving an input signal from the dependent.

Embodiments of the system are also directed to a system comprising a care apparatus and an article of clothing comprising conductive fabric and a communication module coupled to the conductive fabric. The communication module can be configured to communicate with the care apparatus.

The care apparatus can comprise a processor and a computer readable medium coupled to the processor comprising code configured to perform any of the methods described herein.

These and other embodiments of the invention are described in further detail below.

DETAILED DESCRIPTION

Embodiments of the invention are directed to a care apparatus that can soothe and care for a dependent. In an embodiment, the care apparatus may be an infant care apparatus that can take care of an infant. Embodiments of the invention can inform parents of an infant's current status and activity. It can also recognize and interpret patterns in noises made by the infant and can inform the parent of the issue and likely cause and/or it can independently take appropriate action to soothe or care for the infant. The care apparatus may also take action based on the infant's movements and sounds (e.g., cries) and can take action based upon environmental conditions including temperatures, moisture levels, noise levels, brightness, smells, scents, room humidity and other attributes of the air quality in a room such as carbon monoxide levels, radon, mold, etc. The care apparatus may also be in communication with other devices associated with the infant and caregiver, or any other device to help detect the infant's current condition and determine an appropriate action to care for the infant.

The care apparatus can take action and respond to the environmental factors it senses and recognizes. It can soothe a baby that cries by patting it on the back, playing music for it, changing its diaper, uncovering it if a blanket is covering its head, present it with a fresh bottle, check it for a dirty diaper, take its temperature, inform its parents that its diaper needs to be changed, play music, close the blinds if the sun shines too much light on it, etc. In some cases, parents may not want the infant apparatus to touch the baby or child, so soothing actions that do not require touching the baby or child may be invoked.

The care apparatus can record patterns of an infant's behavior (e.g., cries, bedwetting, dirty diaper) and trends and can help track and monitor the baby's daily patterns as well as what actions tend to soothe the baby with a given type of cry, movement or event. Embodiments of the invention can be used to care for an infant or toddler that is relatively stationary or mobile. In some embodiments, the care apparatus may be able to provide "remote babysitting" or "remote caregiving" in addition to infant monitoring, alerts and information transmission. Parents can monitor or guide their child's activities or respond to their needs from a remote location or different part of the dwelling than where the infant is located.

Embodiments of the invention may also include a monitor and a sound and image delivery system to deliver images of the baby to the parents and to provide images and sounds of the parents to the baby. Additional features may include:

- Wheels, tracks or other mechanism to enable the movement of the care apparatus.
- An arm or extension that contains a device (hand) to extend to the child for soothing, patting, burping, picking things up, storing items, cleaning up, etc. The hand can be contoured and contains human characteristics (softness, warmth, skin-like, fingers, etc.), which helps to soothe the child and function like a parent's hand.
- A programmable interface/display panel/interface for setting the unit for alerts (sounds, temperature, etc.) and to assist it with interpreting baby sounds. For instance, if the care apparatus is in the room when an infant cries, it will hear it and recognize that it is crying. If a parent is in the room and comforts the child by singing, the parent can program that event into the apparatus so that the apparatus knows that it plays a song when the baby cries in that manner (e.g., a mild, intermittent cry). This apparatus is intelligent and can adapt to circumstances that were recognized, recorded and programmed.
- Speakers.
- A microphone.
- A camera.
- A projector.
- Storage areas.
- Heating and cooling elements to store milk, water, formula, bottles, diapers, wipes
- Sterilization unit to sterilize items.
- A display screen to project images, movies, graphics, etc.
- A battery compartment and/or charger/plug.
- Communication capabilities (via MNO, WIFI, LAN, WAN, etc) to enable parental communication and alerts via phone, text, email, pictures, etc.

Figure 1:
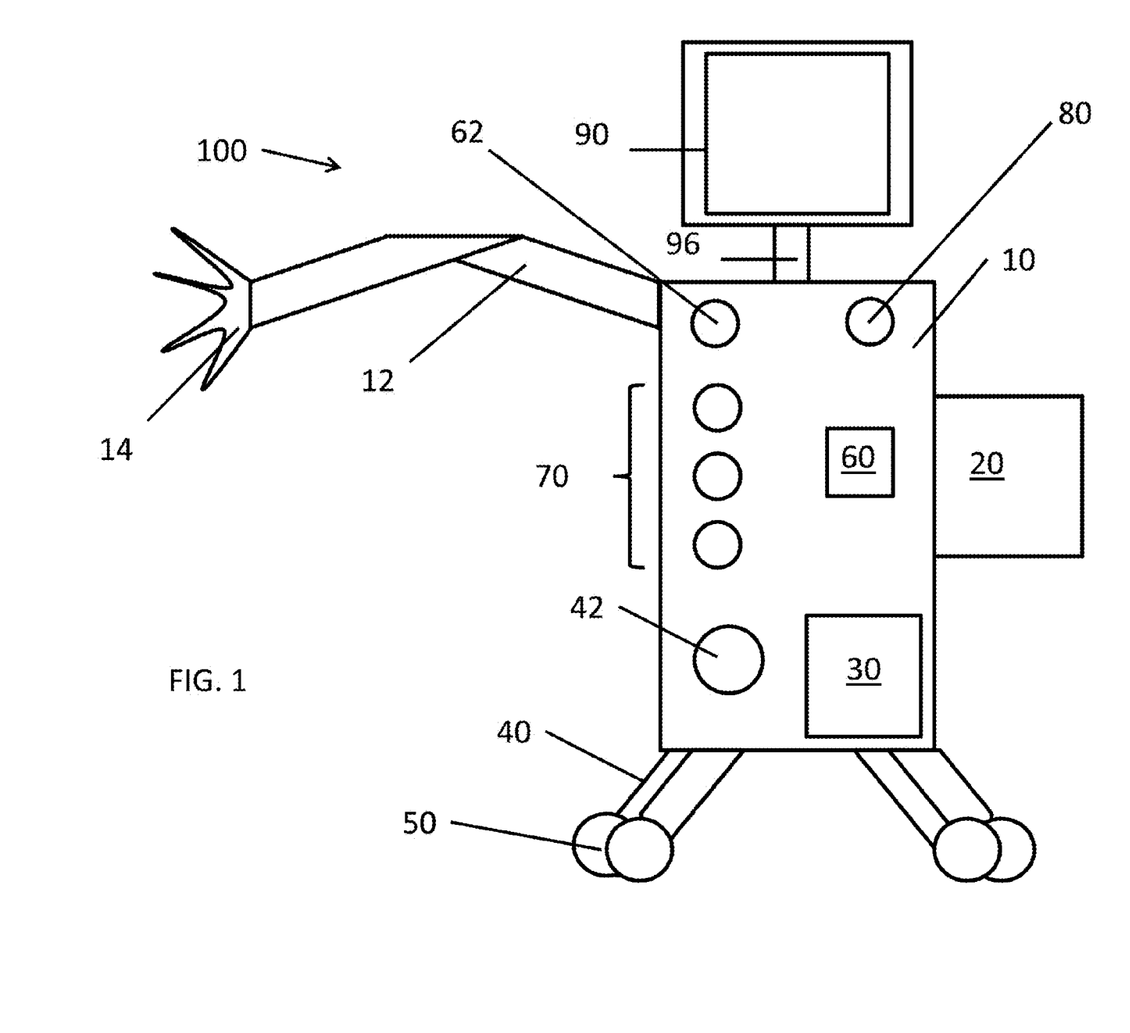
FIG. 1 is a schematic drawing of an exemplary care apparatus according to embodiments of the invention.

FIG. 1 is a schematic drawing of an exemplary care apparatus 100 according to embodiments of the invention. As described above, care apparatus 100 may comprise components that can enable movement, sense environmental characteristics, detect an infant's condition, and carry out any suitable actions to care for the infant.

Care apparatus 100 includes a housing 10 and a video monitor 90 attached to the housing 10 through a movable connector 96. The housing 10 may have any suitable shape (e.g., a box or cylindrical shape) that may enclose components of housing 10.

Movable connector 96 may allow a video monitor 90 to move relative to housing 10. A motor (not shown) inside housing 10 may enable video monitor 90 to rotate along various axes. For example, movable connector 96 may enable video monitor 90 (or other type of display) to rotate sideways or bend forward along a horizontal and vertical axis, respectively.

Video monitor 90 may display information to a user. For example, video monitor 90 may show information, pictures, and videos. Video monitor 90 may comprise any suitable type of display (e.g., LCD screen, CRT monitor, seven-segment display, etc.).

In some embodiments, video monitor 90 may display a user interface that a caregiver may navigate through for various purposes. For example, video monitor 90 may allow the caregiver to edit settings of care apparatus 100 and view past activity of the infant and care apparatus 100. In some cases, video monitor 90 may comprise a touch screen that enables the caregiver to interact with the user interface that may comprise various interactive elements (e.g., software buttons, sliders, check boxes, cursors, menus, scrollers, windows etc.). The user interface may provide a user the capability to affect, interact, and/or operate one or more components of care apparatus 100. The user interface may contain, communicate, generate, obtain, and/or provide component, system, user, and/or data communications, requests, and/or responses.

A projector 60 may enable care apparatus 100 to display information onto other surfaces. For example, projector 60 may be capable of displaying words, pictures, videos, and other information onto a wall of a room. In some embodiments, care apparatus 100 may project content from a mobile device (e.g., mobile phone, tablet, etc.). The mobile device may communicate with care apparatus 100 by a connected cable or any suitable wireless network.

A camera 62 may enable care apparatus 100 to receive and store images (or videos). Received images may be utilized for various purposes. For example, images may be utilized as inputs for facial recognition software. Care apparatus 100 may conduct an enrollment process for a child or caregiver by storing one or more images of their face, which can compared by any suitable facial recognition method to images taken of the child or caregiver in the future. Further, images can be utilized to detect environmental conditions. For example, camera 62 may take an image to detect the brightness or darkness of a room and accordingly adjust the light level in certain situations.

To allow the care apparatus 100 to move freely, a number of wheel supports 40 may connect the wheels 50 to the housing 10. A motor (not shown) inside of housing 10 may rotate the wheels 50 and enable care apparatus 100 to move in one or more desired directions. Other types of motion elements (e.g., rollers, shocks etc.) may be utilized in embodiments of the invention. For example, the motion elements may allow care apparatus 100 to move up and down stairs, steps or slopes. In some embodiments, the wheel supports 40 may be controlled by motors (not shown) in housing 10 that may orient wheel supports 40 in various angles. This may enable housing 10 to be adjusted to lower or higher positions for various situations.

The care apparatus 100 may include a number of input elements, which may be utilized alone or in combination. An exemplary input element may be an input device such as microphone 80, which can receive sound from various sources and communicate them to care apparatus 100. Microphone 80 may be any device that converts sound to an electric signal. In some embodiments, microphone 80 may be used to capture one or more voice segments from a caregiver or other user.

In some embodiments, microphone 80 may receive vocal instructions from a caregiver. For example, a parent may speak into microphone 80 to inform care apparatus 100 to carry out a specific action to soothe the infant in a certain situation. In some cases, care apparatus 100 may utilize sound received by microphone 80 to conduct voice recognition of a caregiver or infant. For example, care apparatus 100 may detect by microphone 80 that the infant is crying and accordingly carry out a suitable action meant for the infant. Any sound received by microphone 80 may be recorded by care apparatus 100.

Input elements may also include programming buttons 70. In some embodiments, programming buttons 70 may be in the form of a keypad, keyboard, or mouse. The caregiver may press programming buttons 70 to communicate with care apparatus 100. In some cases, programming buttons 70 may exist in various forms (e.g., slider, knob, etc.) that may be activated with actions other than a simple press. Programming buttons 70 may be utilized to navigate the user interface displayed on video monitor 90.

The care apparatus 100 may also include a number of output elements, which may be utilized alone or in combination. An exemplary output element may be a speaker 42, which may be a built-in speaker or any other device that produces sound in response to an electrical audio signal. Speaker 42 may play recorded sounds, as well as prerecorded messages to communicate with the caregiver. For example, speaker 42 may play a message to acknowledge that it has received instructions from the caregiver or provide any other suitable notifications to the caregiver. Another exemplary output element may be a display, such as of video monitor 90, to visually communicate information to the caregiver and the infant. In some embodiments, care apparatus 100 may comprise one or more displays.

A storage container 20 of any suitable size may be attached to or incorporated within the housing 10. The storage container 20 may hold care supplies (e.g., bottles, blankets, clothing, toys, etc.) that the care apparatus 100 may use to care for a dependent. The storage container 20 may also provide a space for sterilization of containers.

In some embodiments, storage container 20 may be controlled to maintain a certain temperature range. For example, storage container 20 may act as a cooler box to store milk in baby bottles. In another example, storage container 20 may maintain a warmer temperature to warm blankets, clothes, food, and other belongings. Storage container 20 may be temporarily detached from care apparatus 100. In some embodiments, care apparatus 100 may send a notification to a device associated with a caregiver regarding any information surrounding storage container 20. For example, the notification may indicate when storage container 20 is left detached for a period of time, a current temperature of storage container 20 or sections within it, and a list of care supplies stored inside.

Storage container 20 may be opened by care apparatus 100 when it is detected that care supplies stored inside may be utilized to care for the dependent. For example, care apparatus 100 may detect an input signal indicating hunger from the dependent or device associated with the dependent and open storage container 20 to access food or drinks (e.g., milk, water, etc.).

In some cases, storage container 20 may be separated into multiple sections, each section comprising care supplies meant for a specific dependent (e.g., each child), caregiver, or specific situation (e.g., time of day, type of input signal from dependent, etc.). Upon receiving an input signal from the dependent (e.g., request for diaper change, food, drinks, warmth, etc.), caregiver (e.g., voice command, activation of input elements, etc.), or environment (e.g., temperature, light level, noise level, etc.), storage container 20 may determine which section of storage container 20 is associated with an appropriate response type to the detected signal. Subsequently, storage container 20 may open the appropriate section so that the care supplies inside may be accessed. In some embodiments, care apparatus 100 may comprise multiple storage containers that may each be meant for a specific dependent, caregiver, or environment.

A battery pack 30 may be used to provide power to the care apparatus 100. Battery pack 30 preferably contains rechargeable batteries (e.g., lithium ion, etc.) that may be charged in any suitable manner (e.g., connected power cable, wireless charging, etc.) and may be replaced at any time. In other embodiments, the care apparatus may include a power cable which may be remain plugged into a wall socket or other external power source, where the power cable may not restrict care apparatus 100 from moving according to embodiments of the invention.

The care apparatus 100 may also comprise an arm 12 and an appendage 14 resembling a hand. The arm 12 may move up or down, side to side, etc. Although one arm is show for purposes of illustration, it is understood that the care apparatus 100 may include two or more arms.

While embodiments of the invention can be based on taking care of a baby or young child, embodiments of the invention may be utilized in other situations that can benefit from remote monitoring, automated and informed response and assistance. Such situations may include industrial applications at companies, workplace monitoring and support, assistance at animal shelters or veterinary clinics, day care centers, and public places (e.g., airports, malls, sporting events, etc.). The combination of monitoring and intelligent response and services provided can assist in these situations by detecting, responding to, and providing assistance based on certain events, behaviors, sounds, motions, etc.

Figure 2:
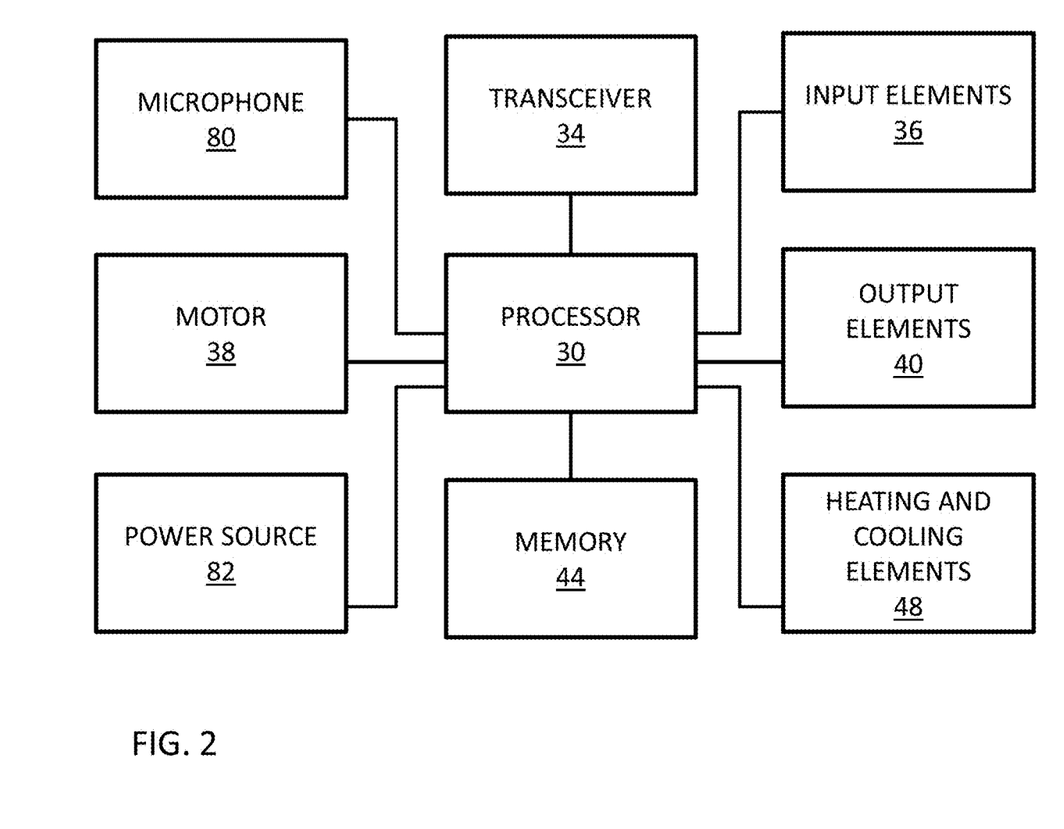
FIG. 2 shows a block diagram of components in a care apparatus according to embodiments of the invention.

FIG. 2 shows a block diagram of some electronic components of care apparatus 100 according to embodiments of the invention. Care apparatus 100 includes a processor 30. A microphone 80, a transceiver 34, input elements 36, a motor 38, output elements 40, a power source 82, a memory 44, and heating and cooling elements 48 may be coupled to the processor 30.

The processor 30 may include hardware within care apparatus 100 that carries out instructions embodied as code in a computer-readable medium (e.g., a non-transitory computer-readable medium). An exemplary processor may be a central processing unit (CPU). The CPU may comprise at least one high-speed data processor adequate to execute program components for executing user and/or system-generated requests. The CPU may be any commercially available microprocessor (e.g., AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s)). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

The motor 38 may drive one or more movable elements (e.g., wheels, movable connectors, arms etc.). An output signal from processor 30 may control motor 38 and control the orientation of movable elements of care apparatus 100.

In some embodiments, care apparatus 100 may comprise multiple motors that may be individually controlled to move in specified directions.

The transceiver 34 may include any suitable communication device that is capable of receiving or transmitting wireless signals to and from care apparatus 100. Transceiver 34 may be capable of transmitting over a short range (e.g., within same room), or a long range (e.g., within same house). In some embodiments, transceiver 34 may enable care apparatus 100 to communicate with other nearby devices. For example, transceiver 34 may receive or transmit wireless signals to wearable devices with communication capabilities worn by a caregiver or others within a house (e.g., family members, infant, etc.). In some cases, care apparatus 100 may communicate with and control other devices that may have wireless communication capabilities around the house (e.g., light bulb, air conditioner, window, curtain, etc.)

The input elements 36 may include any suitable device that can be used to input data to the processor 30. Examples of input elements 36 may include a keyboard, keypad, mouse, touchpad, buttons, etc. as described in reference to FIG. 1. Other input elements 36 may also include detectors such as smoke detectors, carbon monoxide detectors, radon detectors, etc. Information received by input element 36 may be processed by care apparatus 100 to select an appropriate action to conduct.

The output elements 40 may provide any suitable audio or visual outputs. Examples of output elements 40 may include a speaker or a display as described in reference to FIG. 1.

The power source 82 may be any suitable power module that can provide sufficient energy to care apparatus 100. Power source 82 may include a power cord connected an external power source, and/or an internal power supply of any suitable type of power cells (e.g., alkaline, lithium hydride, lithium ion, lithium polymer, nickel cadmium, solar cells etc.). Any other types of AC or DC power sources may be used as well.

The heating and cooling elements 48 may include heating or cooling coils, which can supply heat to or withdraw heat from a portion of care apparatus 100. In some embodiments, heating and cooling elements 48 may be utilized to maintain a certain temperature range for storage container 20.

The memory 44 may include one or more suitable volatile or non-volatile memory devices. Such devices may use any suitable mechanism for data storage. Memory 44 may comprise one or more memory chips (e.g., ROM, EEPROM, etc) or other storage devices. A storage device may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like.

Memory 44 may be programmed with any suitable code to perform any suitable method that can be executed by the processor 30. For example, the memory 44 may be programmed with voice or sound recognition software, facial recognition software, and any suitable control software that can respond to sounds or images. Specific responses to input signals may be stored in memory 44. Responsive to such input signals, care apparatus 100 may play music, sounds (e.g., birds chirping, parents' voices, etc.), or videos, touch the infant, contact a caregiver, protect the infant, etc.

In another example, infant preferences may be stored in memory 44 and may be utilized by care apparatus 100 to determine appropriate actions to take to care for the infant.

In some embodiments, memory 44 may store comparisons of an infant's response to different actions taken in similar situations. For example, if a particular infant responds more favorably to music than a video after crying, then this preference may be programmed into memory 44.

In some embodiments, memory 44 may store aggregated information regarding the infant's historical responses to certain actions. Memory 44 may comprise artificial intelligence software that can utilize such stored information to interpret and learn patterns of an infant's behavior or mood, better interpret the infant's response to certain stimuli, and provide an appropriate response. In some cases, the software may enable care apparatus 100 to conduct actions that may vary from previously conducted actions (e.g., slowly turning down or off music as the infant falls asleep), detect whether the change is favorable, and store a detected result in memory 44. The aggregated information, along with any analysis or summary report of the information, may be viewed by a user (e.g., caregiver) at any time.

In some cases, the memory 44 may comprise one or more customized table (or databases) that may store actions that can be taken in response to different signals received by care apparatus 100 from the infant. Examples of different audio signals from the infant may include a high pitched cry, a low pitch cry, or a laugh. These signals may be associated with certain moods of the infant. A mapping of different responses (e.g., playing music, playing a video, moving to the infant, touching the infant, etc.) to the different signals or moods may be programmed into memory 44. The magnitude or intensity of the infant's cry or laugh may be specified in the table and hence alter the selection of an appropriate action by care apparatus 100.

An additional level of complexity and customization may be added to the table by providing different responses to different external environmental signals (e.g., time of day, surrounding temperature, surrounding noise level, etc.). For example, different responses may be provided for a laugh, depending upon the time of day. If the infant laughs at night, then soothing music may be played to put the infant to sleep. However, if the infant laughs during the day, then the care apparatus 100 may be programmed to play with the infant.

In some embodiments, care apparatus 100 may store customized responses entered by a caregiver or other user. For example, a caregiver may program a specific song, picture, video, movie, or recording of their voice to be utilized by care apparatus 100 in a certain situation. In some cases, a caregiver may indicate to care apparatus 100 to prioritize such customized responses.

Further complexity and customization may be added to the table by providing different responses based on whereabouts of others in the household. For example, different responses may be provided for a cry, depending upon who is present in the household. Care apparatus 100 may determine that a parent is in the house by detecting an associated device (e.g., smart watch, bands, jewelry, clothing, etc.). Care apparatus 100 may send a message to the parent's associated device indicating that the baby is crying, along with any other relevant information. In some cases, care apparatus 100 may also send such a message to devices operated by others in the household (e.g., siblings, aunt, uncle, grandparent, etc.).

Memory 44 may also comprise software that allows care apparatus 100 to care for more than one dependent at a time. Care apparatus 100 may have multi-modal capability and thus have multiple operational modes, one for each dependent (e.g., child, baby, etc,) in the environment (e.g., household, hospital, etc.). In this case, memory 44 may store a set of data associated with each child in the household and utilize software on each set of data to determine an appropriate response for each child. Care apparatus 100 may also utilize information stored in memory 44 to identify each child by conducting voice or face recognition or by detecting a device capable of wireless communication (e.g., smart band, clothes, diaper, etc.) worn by each child.

Memory 44 may also store vocal or visual cues (e.g., hand gesture, head gesture, etc.) programmed by a user (e.g., caregiver) that may be associated to certain instructions (e.g., three claps means yes, hand wave means no, etc.). These vocal or visual cues may be utilized by the user to communicate with care apparatus 100.

Memory 44 may also comprise a computer readable medium comprising code executable by the processor to complete a method. The method may comprise receiving an action request message comprising a requested action from a communication module associated with a dependent and detecting a plurality of devices associated with a plurality of caregivers. The method may further comprise selecting a first caregiver from the plurality of caregivers and sending the action request message to a first device associated with the first caregiver. The method further comprise determining whether to take further action based on whether a response is received from the first device associated with the first caregiver and detecting that the requested action has been completed by communicating with at least the communication module associated with the dependent.

Figure 3:
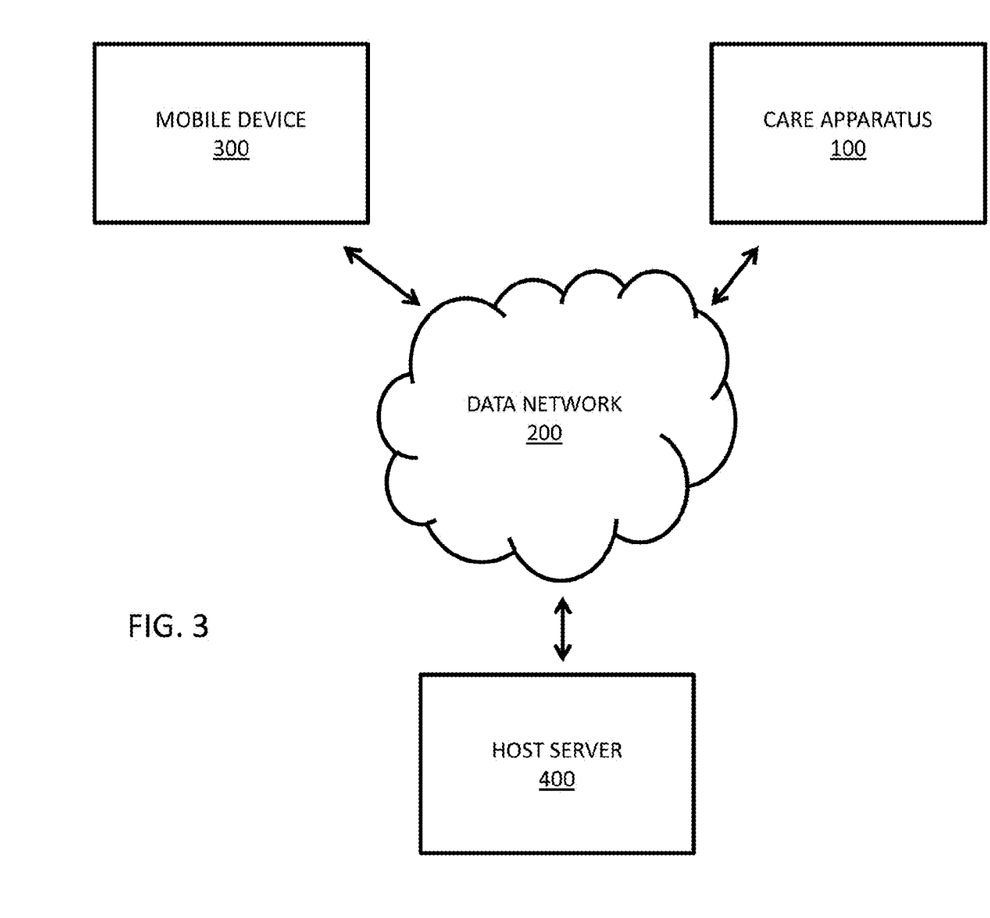
FIG. 3 illustrates a block diagram illustrating a system according to embodiments of the invention.

FIG. 3 shows a system that can use the care apparatus according to embodiments of the invention. The system may include the care apparatus 100, a host server 400, and a mobile device 300 in communication with each other via a data network 200.

It will be appreciated that any suitable communication links between the computers and devices may be used in embodiments of the invention. The existence of any of various well-known protocols such as TCP/IP, Ethernet, FTP, HTTP and the like is presumed, and the system can be operated in a client-server configuration to permit a user to retrieve web pages from a web-based server.

Data network 200 may employ any suitable communications network. For example, data network 200 may employ connection protocols such as, but not limited to: direct connect, Ethernet (thick, thin, twisted pair 10/100/1000 Base T, and/or the like), Token Ring, wireless connection such as IEEE 802.11a-x and/or the like. A communications network may be any one and/or the combination of the following: a direct interconnection; the Internet; a Local Area Network (LAN); a Metropolitan Area Network (MAN); an Operating Missions as Nodes on the Internet (OMNI): a secured custom connection; a Wide Area Network (WAN); a wireless network (e.g., employing protocols such as, but not limited to a Wireless Application Protocol (WAP), I-mode, and/or the like); and/or the like.

The host server 400 may include a processor and a computer readable medium. The computer readable medium may comprise code, executable by the processor for implementing a method. For example, using mobile device 300 or other communication device, the care apparatus 100 may be programmed by interacting with the host server 400. Functions such as how the care apparatus 100 may interact or communicate with an infant may be selected on a Web site (or application) run by the host server 400, and code to initiate these functions may be downloaded to the care apparatus 100. The web browser of the website (or application with similar capability) may contain, communicate, generate, obtain, and/or provide component, system, user, and/or data communications, requests, and/or responses.

The host server 400 may also be used as an intermediary when mobile device 300 is used to communicate with care apparatus 100 remotely. For example, the care apparatus 100 may receive images or audio of an infant and these signals may be transmitted to mobile device 300 via data network 200. In another example, care apparatus 100 may receive a signal from an infant (e.g., a cry) and may contact host server 400. The host server 400 may in turn send a message with a menu of response options to mobile device 300. For instance, the response options may include a) play music, b) project a video, or c) contact others (e.g., caregiver, neighbors, etc.).

In other embodiments, the host server 400 may not be needed, as the mobile device 300 may program care apparatus 100 directly (e.g., via a Bluetooth connection or a cable).

Figure 4:
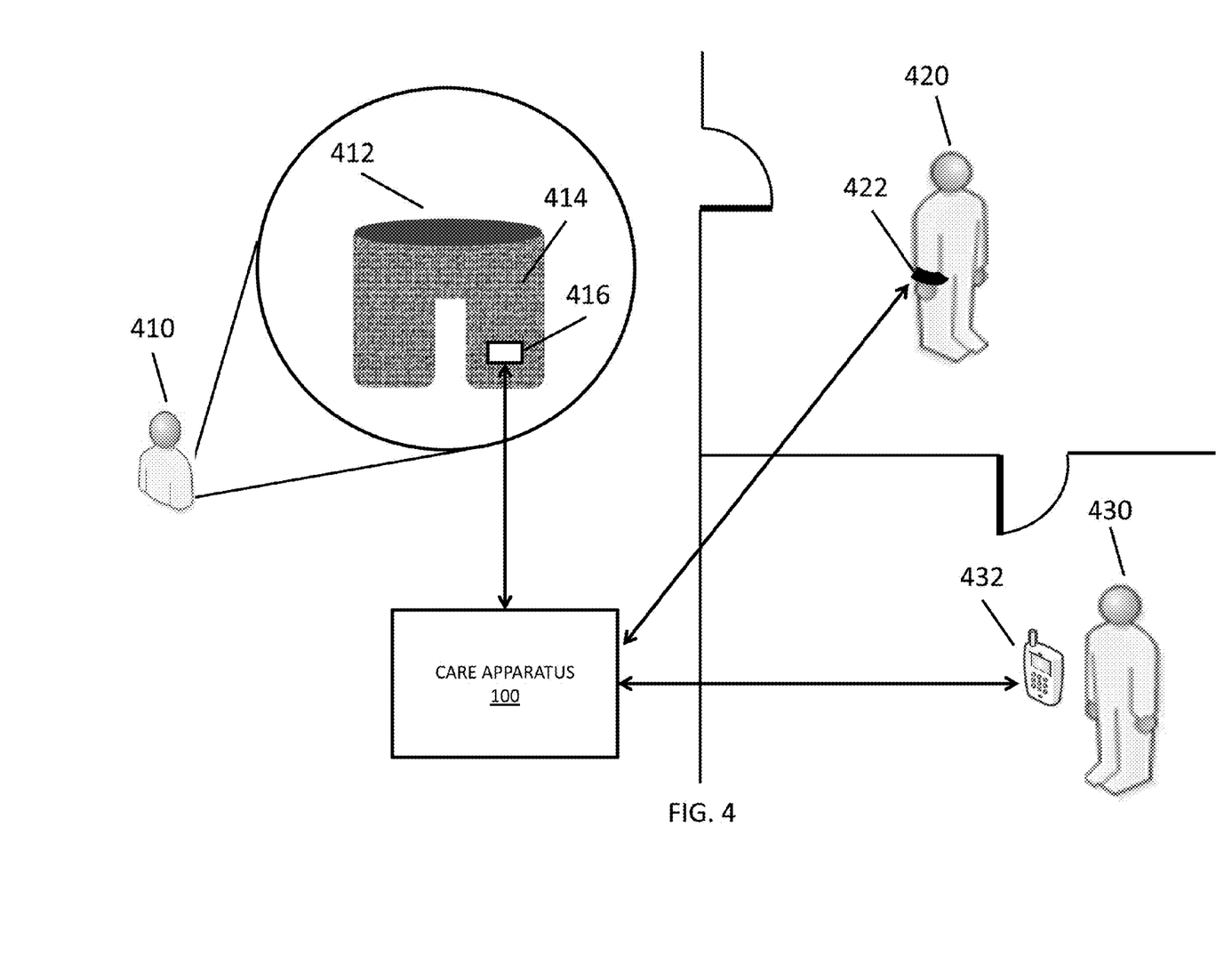
FIG. 4 shows another exemplary environment and system in which care apparatus 100 may be utilized according to embodiments of the invention.

FIG. 4 shows another exemplary environment and system in which care apparatus 100 may be utilized according to embodiments of the invention. The exemplary environment may include an infant 410 with clothing 412 comprising conductive fabric 414 and a communication module 416 comprising a transceiver, a first caregiver 420 with a smart watch 422, and a second caregiver 430 with a mobile phone 432 in different rooms of a house. Care apparatus 100 may be in communication with smart watch 422, mobile phone 432, and the communication module 416 comprising transceiver by any suitable communications network. In addition to the transceiver, the communication module 416 may comprise a data processor, one or more sensors, a memory element, and an interface for communicating with conductive fabric 414 of the clothing.

Figure 5A:
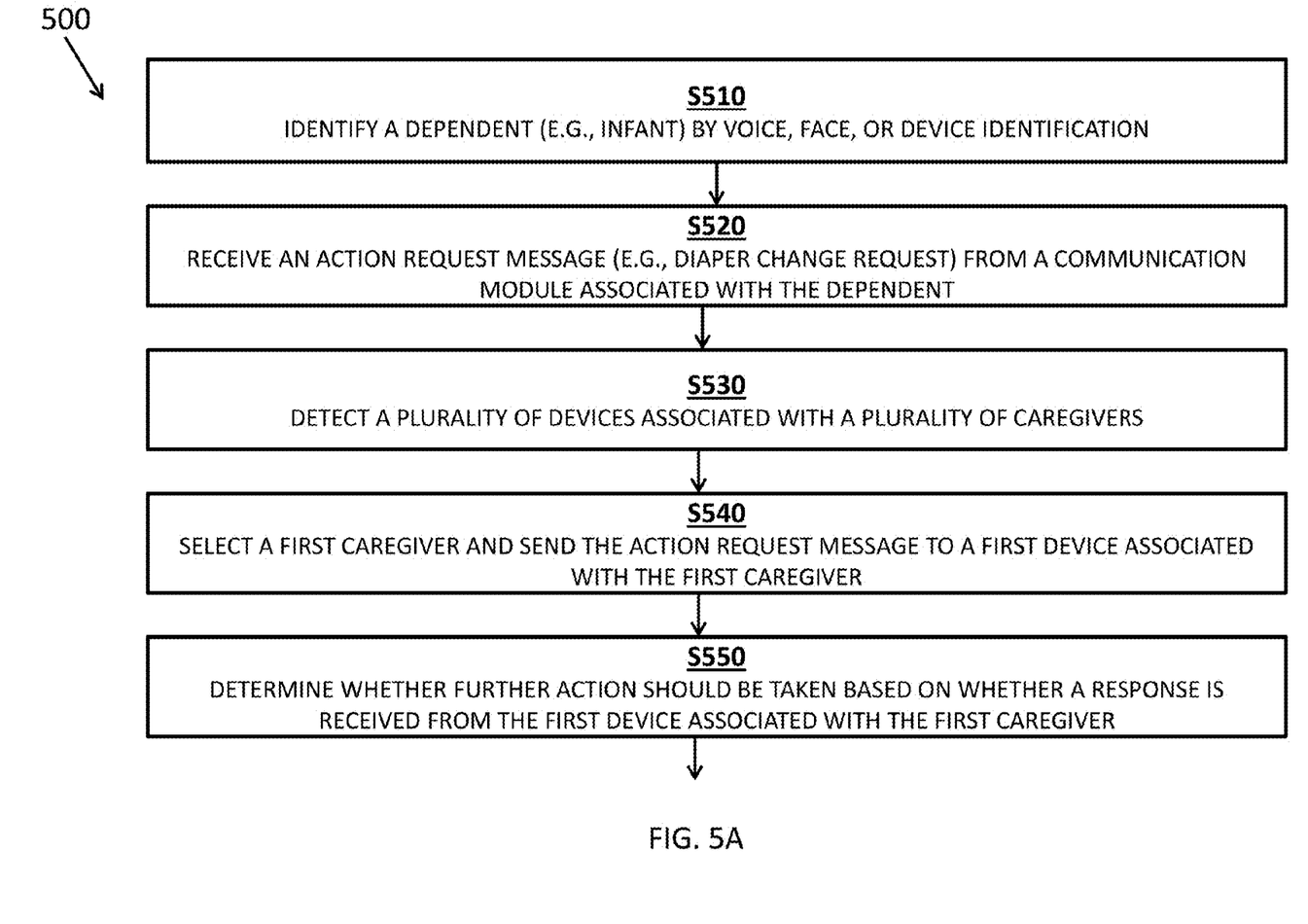
FIG. 5A-B shows an exemplary flow diagram of a method in which care apparatus 100 may be utilized according to embodiments of the invention.
Figure 5B:
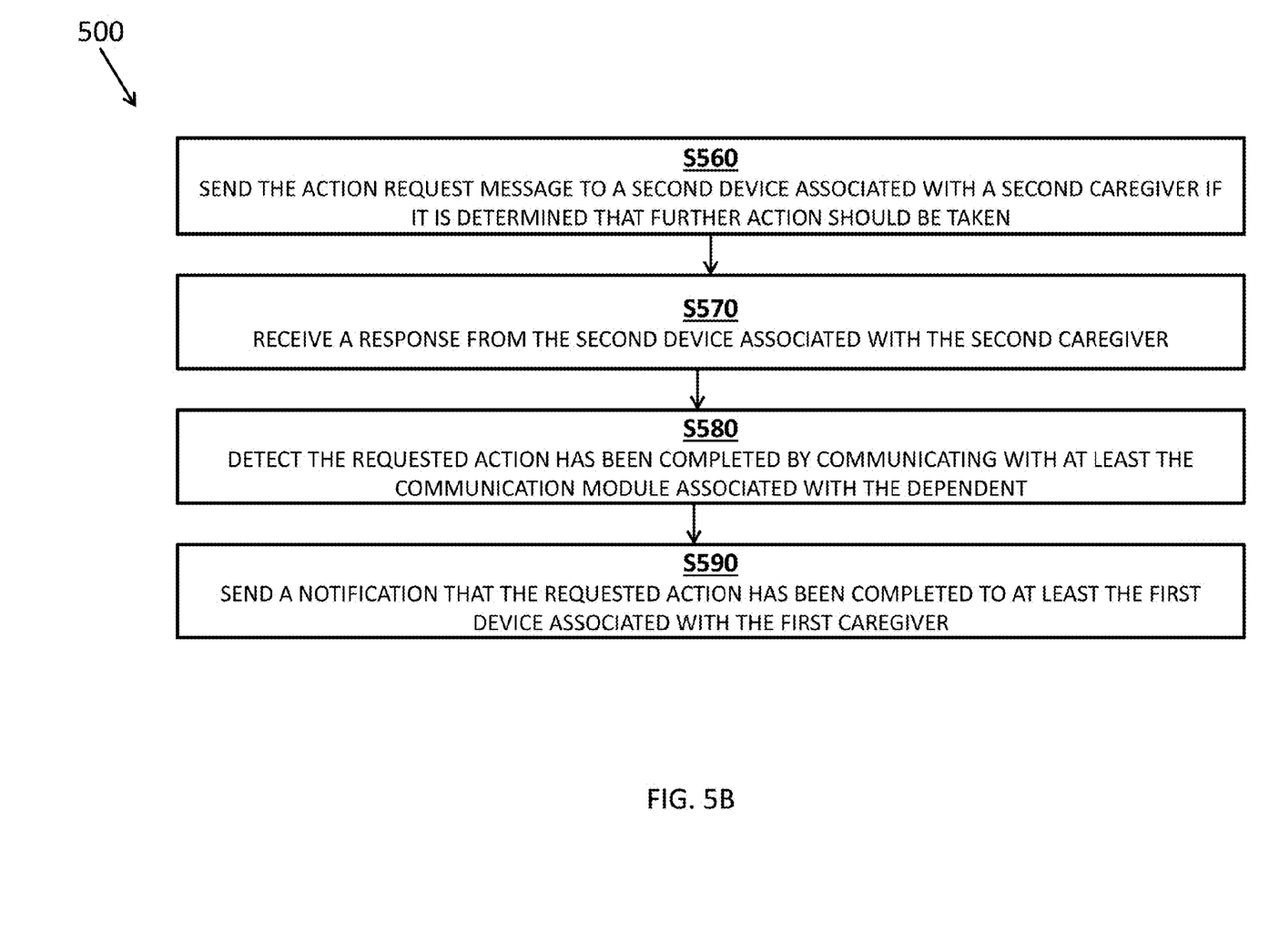

FIG. 5A-B shows an exemplary flow diagram 500 of a method that may be described in reference to FIG. 4. The steps in the flow diagram (e.g., S510, S520, S530, etc.) are indicated in the following description.

Infant 410 may be in a room with care apparatus 100, which may identify (S510) and monitor the condition of infant 410. Care apparatus 100 may identify infant 410 by various biometric identification mechanisms (e.g., facial, voice, eye, etc.) and may subsequently operate in a mode customized to infant 410. Care apparatus 100 may also identify infant 410 by an associated device with wireless communication capabilities. For example, infant 410 may be wearing clothing 412 comprising conductive fabric 414 and communication module 416.

Clothing 412 may be capable of communicating to and from care apparatus 100 regarding information surrounding infant 410. In some embodiments, clothing 412 may be a diaper that can communicate to care apparatus 100 when it may be an appropriate time for a diaper change for infant 410. In some implementations, clothing 412 may comprise a processor and one or more sensors (not shown), coupled to the processor, of various types (e.g., weight, flex, smell, temperature, etc.) that may detect when the diaper change is appropriate. Clothing 412 may also comprise a memory element coupled to the processor comprising code to determine whether an action (e.g., diaper change) request message should be sent based on the detected condition of infant 410. The communication module 416 may further comprise an interface that can communicate with conductive fabric 414. Subsequently, the communication module 416 comprising the transceiver as part of the interface may enable clothing 412 to communicate wirelessly with and send an action (e.g., diaper change) request message to care apparatus 100.

Care apparatus 100 may receive an action request message (e.g., diaper change request) from the communication module 416 (S520), and may determine an appropriate action to take based on the current environment. For example, care apparatus 100 may detect who else may be present in the house. Care apparatus 100 may detect that first caregiver 420 and second caregiver 430 are present in other rooms of the house by detecting their associated devices (e.g., smart watch, mobile phone, etc.) (S530). Care apparatus 100 may access stored information regarding which caregiver to prioritize to contact with the diaper change request message. For example, care apparatus 100 may recognize first caregiver 420 is a parent and second caregiver 430 is an older sibling. Care apparatus 100 may select and prioritize sending the message to first caregiver 420 (S540), before sending the message to the second caregiver 430.

Care apparatus 100 may send the message to smart watch 422 of first caregiver 420 and determine whether any further action should be taken (S550). In some cases, first caregiver 420 may receive the message and activate a button on smart watch 422 that sends an acknowledgement to care apparatus 100 that the message was received. If first caregiver 420 does not come to change the diaper of infant 410 after a certain time period, a reminder message may be sent to smart watch 422. In some embodiments, care apparatus 100 may detect the whereabouts, and therefore whether first caregiver 420 entered the room with infant 410, by detecting the location of smart watch 422.

Care apparatus 100 may also take other actions depending on the current condition of infant 410. In one case, care apparatus 100 may detect by its microphone that infant 410 is crying. Care apparatus 100 may utilize stored information about infant 410 to determine an appropriate action to take in order to attempt and soothe infant 410. For example, care apparatus 100 may have stored previous actions taken and corresponding responses when infant 410 was crying and needed a diaper change. Taking into account any other relevant information (e.g., time of day, temperature, time of last diaper change, etc.), care apparatus 100 may select an appropriate action, such as decreasing the brightness in the room, playing soothing music, and projecting calming pictures. This may help relax infant 410 until a caregiver is able to come and conduct a diaper change.

In some cases, first caregiver 420 may not notice and neglect to respond the received message for any reason. After a certain time period, care apparatus 100 may determine that further action may be taken since no response from first caregiver 420 can be detected. Care apparatus 100 may then send the action request message (e.g., diaper change request) to mobile phone 432 operated by second caregiver 430 (S560). Second caregiver 430 may see the message and send a response (e.g., acknowledgement message) to care apparatus 100 (S570).

Second caregiver 430 may then go to the room with care apparatus 100 and infant 410 to conduct the diaper change for infant 410. In some cases, second caregiver 430 may not explicitly send an acknowledgement to care apparatus 100 prior to conducting the diaper change. However, care apparatus 100 may recognize that second caregiver 430 is present in the room with infant 410 by other methods (e.g., location detection of mobile device 432, voice and facial recognition of second caregiver 430, etc.) and determine that further reminders may not have to be sent to mobile phone 432 operated by second caregiver 430 and smart watch 422 operated by first caregiver 420.

Care apparatus 100 may detect the diaper change has been completed by second caregiver 430 in various ways. For example, clothing 412 may communicate by its communication module 416 to care apparatus 100 that the diaper is now clean (S580). In another example, second caregiver 430 may activate a button on mobile phone 432 or an input element on infant apparatus 100 to inform care apparatus 100 that the diaper change was completed. In some embodiments, second caregiver 430 may vocally indicate to care apparatus 100 that the diaper change was completed. Subsequently, care apparatus 100 may recognize the vocal instruction from second caregiver 430 and acknowledge that the diaper change has been completed.

After second caregiver 430 completes the diaper change for infant 410, care apparatus 100 may send a notification to smart watch 422 of first caregiver 420 (S590). The notification may include an indication that the diaper change was completed and any other relevant information. For example, the message may include the time of the diaper change, the person who conducted the diaper change, as well as the current condition of infant 410 (e.g., sleeping, calm, crying, etc.). In some embodiments, care apparatus 100 may send the notification to mobile phone 432 of second caregiver 430 as well.

While the embodiment above describes clothing 412 as a diaper, embodiments are not so limited. For example, clothing 412 may be pants that may be worn on top of a diaper, where the pants may detect whether it is an appropriate time for a diaper change. In some embodiments, clothing 412 may detect other conditions of infant 410, such as general body temperature, heart rate, nutrition, hunger, etc. Clothing 412 may send any detected information to care apparatus 100, which may determine an appropriate action to take based on the current environment and conditions of infant 410. Also, the infant 410 could alternatively be any dependent (e.g., child, adult, senior, pet, etc.) that needs additional care and thus embodiments of the invention are not limited to caring for infants.

Further, while the embodiment above describes care apparatus 100 communicating with smart watch 422 and mobile phone 432, embodiments are not so limited. Care apparatus 100 may communicate with any device with wireless communication capability. For example, first caregiver 420 and second caregiver 430 may operate any suitable device. Some non-limiting examples of such devices may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, and the like.

I. Computer Systems

Figure 6:
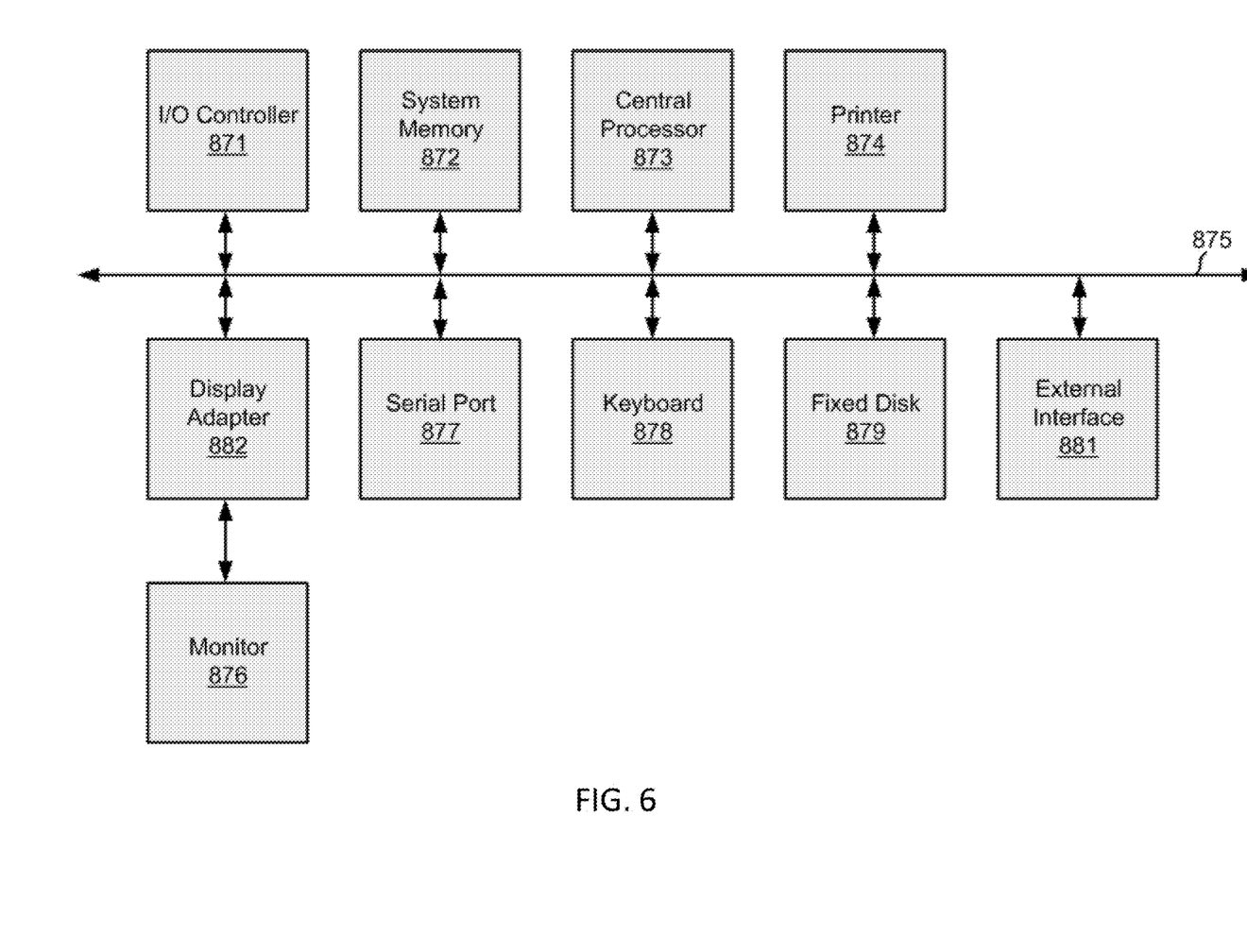
FIG. 6 shows an exemplary computer apparatus according to embodiments of the invention.

FIG. 6 is a high level block diagram of a computer system that may be used to implement any of the entities or components described above including the mobile device 300, the host server 400 or the care apparatus 100. The subsystems shown in FIG. 6 are interconnected via a system bus 875. Additional subsystems include a printer 874, keyboard 878, fixed disk 879 and monitor 876 which is coupled to display adapter 882. Peripherals and input/output (I/O) devices, which couple to I/O controller 871, can be connected to the computer system by any number of means known in the art, such as a serial port. For example, serial port 877 or external interface 881 can be used to connect the computer apparatus to a wide area network such as the Internet, a mouse input device, or a scanner. The interconnection via system bus 10 allows the central processor 873 to communicate with each subsystem and to control the execution of instructions from system memory 872 or the fixed disk 879, as well as the exchange of information between subsystems. The system memory 872 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A method comprising:
    receiving, by a care apparatus over a network, an action request message comprising a requested action and a condition of a dependent from a communication module associated with the dependent, the dependent wearing an article of clothing comprising a conductive fabric that detects the condition of the dependent, the communication module coupled to the conductive fabric;
    detecting, by the care apparatus over the network, a plurality of devices associated with a plurality of caregivers;
    selecting, by the care apparatus, a first caregiver from the plurality of caregivers;
    sending, by the care apparatus over the network, the action request message to a first device associated with the first caregiver;
    determining, by the care apparatus, whether to take further action based on the condition of the dependent detected by the conductive fabric; and
    detecting, by the care apparatus over the network, that the requested action has been completed by communicating with at least the communication module associated with the dependent wearing the article of clothing comprising the conductive fabric coupled to the communication module.

2. The method of claim 1, further comprising:
    determining, by the care apparatus, that no response has been received from the first device;
    selecting, by the care apparatus, a second caregiver from the plurality of caregivers; and
    sending, by the care apparatus, the action request message to a second device associated with the second caregiver.

3. The method of claim 2, further comprising:
    sending, by the care apparatus, a notification that the requested action has been completed to at least the first device associated with the first caregiver.

4. The method of claim 2, wherein determining that no response has been received comprises:
    determining, by the care apparatus, an amount of time that has elapsed since the action request message was sent to the first device; and
    determining, by the care apparatus, that the amount of time is greater than a predetermined time period.

5. The method of claim 2, further comprising:
    receiving, by the care apparatus, an input by the second caregiver that the request action has been completed.

6. The method of claim 1, wherein the communication module associated with the dependent includes one or more sensors that can detect any of weight, flex, smell, or temperature.

7. The method of claim 6, wherein the article of clothing is a diaper, and wherein the requested action in the action request message is to clean the diaper based on data detected by the one or more sensors.

8. The method of claim 1, further comprising:
    detecting, by an input device of the care apparatus, a first mood of the dependent;
    selecting, by the care apparatus, an action to perform in order to change the first mood of the dependent to a second mood;
    performing, by the care apparatus, the selected action; and
    detecting, by the input device of the care apparatus, that the first mood of the dependent has changed to the second mood.

9. The method of claim 8, wherein the input device is a microphone and wherein detecting that the first mood of the dependent has changed to the second mood comprises:
   detecting, by the input device of the care apparatus, a change in intensity of the dependent's crying or laughing.

10. The method of claim 9, wherein selecting the action comprises:
   detecting, by the care apparatus, environmental signals; and
   selecting, by the care apparatus, the action based on the environmental signals and the first mood of the dependent.

11. The method of claim 10, wherein the environmental signals comprise any of the time of day, surrounding temperature, and surrounding noise level.

12. A system comprising:
   an article of clothing comprising, a conductive fabric configured to detect a condition of a dependent, and a communication module associated with the dependent and coupled to the conductive fabric, wherein the communication module is configured to communicate the condition of the dependent to the care apparatus; and
   a care apparatus comprising, a computer readable medium coupled to the processor, the computer readable medium comprising code executable to perform a method comprising:
      receiving, over a network, an action request message comprising a requested action and the condition of the dependent from the communication module, the dependent wearing the article of clothing;
      detecting, over the network, a plurality of devices associated with a plurality of caregivers;
      selecting a first caregiver from the plurality of caregivers;
      sending, over the network, the action request message to a first device associated with the first caregiver;
      determining whether to take further action based on the condition of the dependent detected by the conductive fabric; and
      detecting, over the network, that the requested action has been completed by communicating with at least the communication module associated with the dependent wearing the article of clothing comprising the conductive fabric coupled to the communication module.

13. The system of claim 12, the method further comprising:
   determining that no response has been received from the first device;
   selecting a second caregiver from the plurality of caregivers; and
   sending the action request message to a second device associated with the second caregiver.

14. The system of claim 13, the method further comprising:
   sending a notification that the requested action has been completed to at least the first device associated with the first caregiver.

15. The system of claim 13, wherein the step of determining that no response has been received in the method comprises:
   determining an amount of time that has elapsed since the action request message was sent to the first device; and
   determining that the amount of time is greater than a predetermined time period.

16. The system of claim 13, the method further comprising:
   receiving an input by the second caregiver that the request action has been completed.

17. The system of claim 12, wherein the communication module associated with the dependent includes one or more sensors that can detect any of weight, flex, smell, or temperature.

18. The system of claim 12, the method further comprising:
   detecting, by an input device, a first mood of the dependent;
   selecting an action to perform in order to change the first mood of the dependent to a second mood;
   performing the selected action; and
   detecting, by the input device, that the first mood of the dependent has changed to the second mood.

19. The system of claim 18, wherein the input device is a microphone and wherein the step of detecting that the first mood of the dependent has changed to the second mood in the method comprises:
   detecting, by the input device, a change in intensity of the dependent's crying or laughing.

20. The system of claim 19, wherein the step of selecting the action in the method comprises:
   detecting environmental signals; and
   selecting the action based on the environmental signals and the first mood of the dependent.

* * * * *